Oct. 10, 1950          H. C. ZAUN          2,525,330
OIL FILTER
Filed Jan. 30, 1946          2 Sheets-Sheet 1
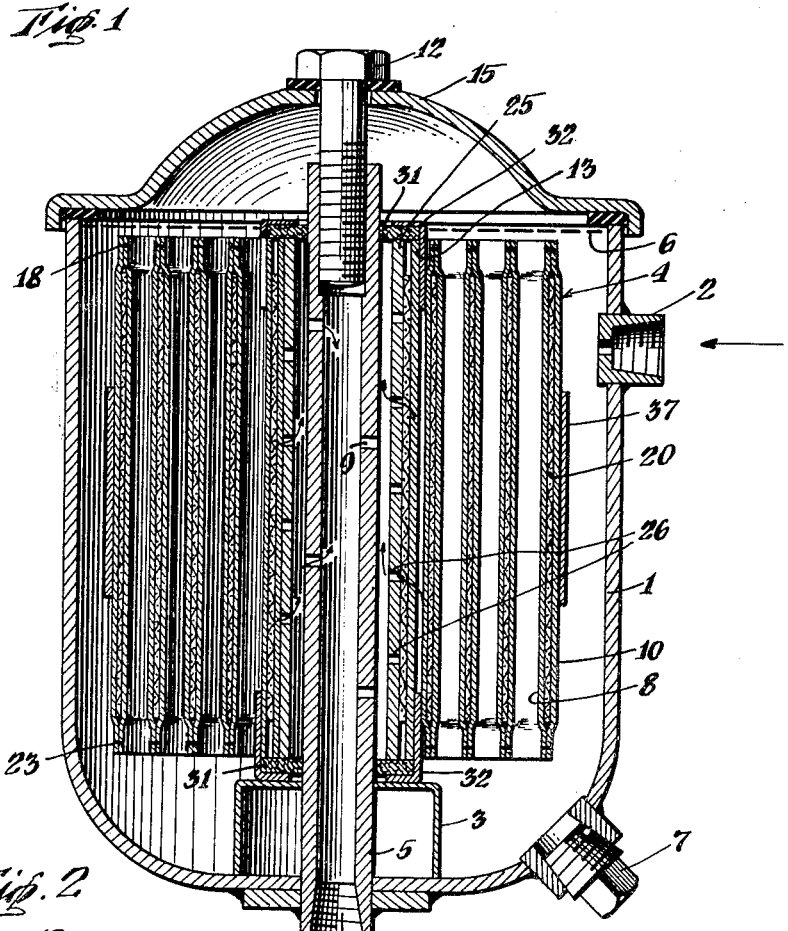
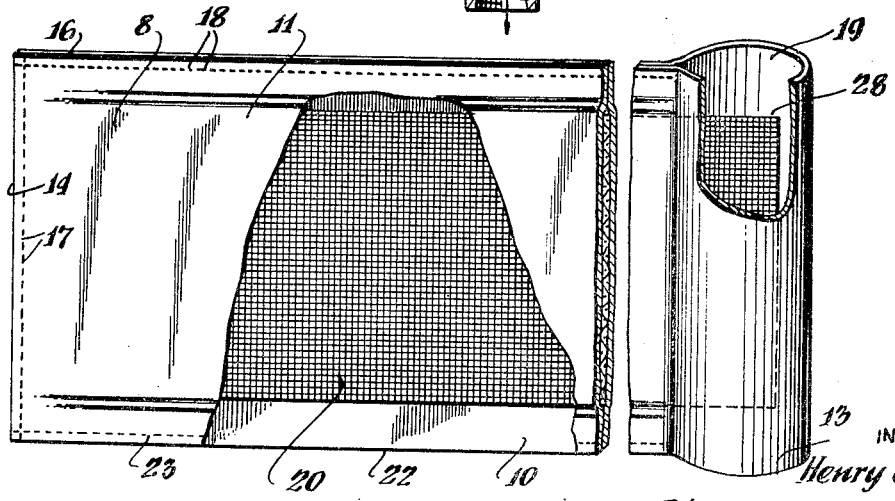
INVENTOR
Henry C. Zaun
BY
Norman N. Holland
ATTORNEY Oct. 10, 1950        H. C. ZAUN        2,525,330
OIL FILTER
Filed Jan. 30, 1946        2 Sheets-Sheet 2
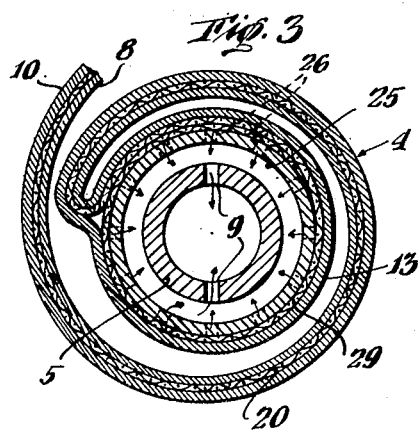
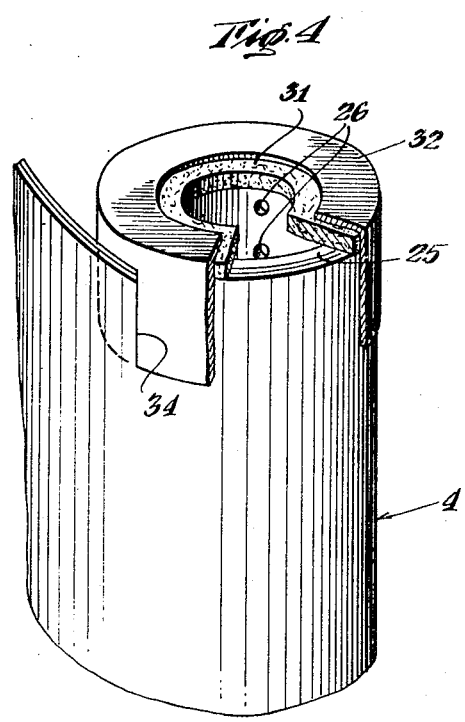
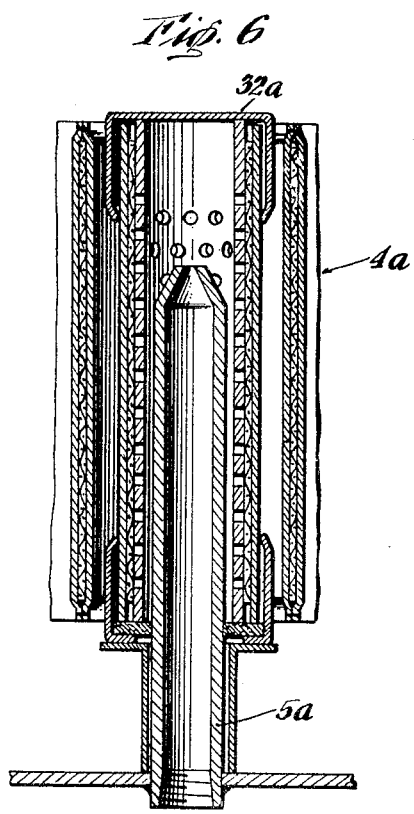
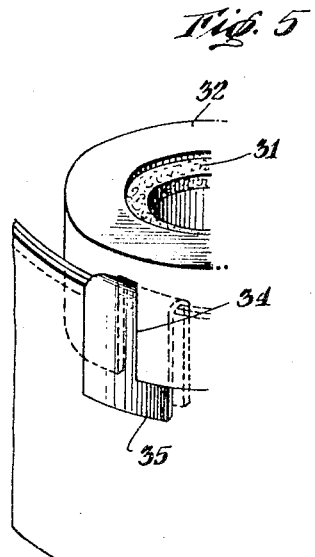
INVENTOR
Henry C. Zaun
BY
ATTORNEY Patented Oct. 10, 1950

2,525,330

UNITED STATES PATENT OFFICE 2,525,330

OIL FILTER

Henry C. Zaun, New York, N. Y., assignor to Filtors, Inc., Long Island City, N. Y., a corporation of New York Application January 30, 1946, Serial No. 644,332

4 Claims. (Cl. 210—165)

The present invention relates to filters and more particularly to a filter of the type utilized with automotive vehicles for removing dirt and other impurities from the oil that is used to lubricate the various parts of the automobile engine.

There are numerous types and sizes of automobile oil filters in existence; some of them possess a particular advantage or advantages over other filters, but most of them are lacking in one or more desirable features. For example, some of them clog rapidly after being in use a comparatively short time, others embody a relatively small effective filtering area and hence cleanse but small amounts of oil, others are cumbersome and expensive and require an excessive amount of attention or maintenance. The majority of filters in use are of the replaceable unit type, comprising an outer shell which remains permanently connected in an oil line and a filter unit proper which is to be removed and discarded when clogged with dirt, the discarded unit being replaced by a new unit; the constructions of some of these filters are sufficiently complicated that car owners prefer to leave a clogged filter in the line rather than go to the trouble and expense of replacing it with a new one.

The present invention aims to overcome or minimize the above and other disadvantages and difficulties by providing an improved filter of light, compact and foolproof construction comprised of a minimum number of parts which may be easily and inexpensively manufactured and installed.

An object of the present invention is to provide a filter of improved, relatively simple and inexpensive construction.

Another object of the invention is to provide a filter having a relatively large and effective filtering area.

Another object of the invention is to provide a replaceable filter unit which may be readily assembled with or removed from existing filter shells.

Another object of the invention is to provide a filter unit which maintains its original shape and filtering properties for relatively long periods of time.

A further object of the invention is to provide a filter which provides an unimpeded flow of oil for a long period of time.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

Fig. 1 is a sectional view illustrating a preferred embodiment of the invention;

Fig. 2 is a fragmentary view, partly broken away, illustrating a portion of the filter shown in Fig. 1;

Fig. 3 is an enlarged, fragmentary, sectional, view showing a preferred assembly of filtering envelope and central duct;

Fig. 4 is an enlarged, fragmentary, perspective view, partly broken away, showing a preferred assembly of filtering envelope and central duct;

Fig. 5 is an enlarged fragmentary view illustrating reinforcing means for a filtering envelope; and Fig. 6 is a fragmentary sectional view illustrating a modified form of the invention.

Referring again to the drawings and more particularly Fig. 1 thereof, there is shown a complete filter as used on a motor vehicle. Described generally, oil enters the filter shell 1 via an inlet connection 2, passes through the filter unit proper or filter cartridge 4 where it is cleaned and emerges from the filter shell via the pipe or conduit 5. A drain plug 7 may be provided at the lower portion of the filter shell 1 for draining off sludge which accumulates therein after a period of time. The shell 1 is generally made of steel and is mounted in oil system so that it receives a portion or all of the oil which passes through the lubrication system; preferably all oil used in the system does not flow in one stream through the filter, but only a portion thereof at a time, and over a period of time the complete volume of oil in the lubrication system will pass through the filter and be subjected to its cleansing action. The inlet side of the filter shell 1 is known as the "pressure" side for reason that oil tends to be forced into the shell at the inlet 2 and pushed or forced out of the shell at the discharge or exit 5.

The element proper or unit 4 in Fig. 1 is of the replaceable type, that is, the filter may be used until such time as its operation becomes inefficient due to its removal of impurities from the oil and at this time the clogged unit may be removed and replaced by a new unit. As illustrated in Fig. 1, the filter unit 4 operates on the "outside-in" principle, dirty oil being normally located at the exterior of the filter unit and clean oil, which filters through to the inside of the filter, being conveyed to a discharge line which leads to an oil reservoir. The present unit 4 both filters the oil and conveys the cleansed oil to the return line leading to an oil reservoir.

In order to both cleanse and convey the oil, an improved filtering envelope or flattened sleeve is utilized. Fig. 2 is a fragmentary view, partially broken away, which illustrates this envelope or tubular flattened member in detail. The sides 8 and 10 of the envelope or sleeve are preferably formed from a strip of suitable filtering material 11 which is folded transversally adjacent the mid portion 13 thereof and doubled back upon itself to form a double thickness of material. Thereafter the double thickness of filtering material is sewed together at the open end 14 thereof and also along one edge 16. Where an ordinary type sewing machine is used single rows of stitching 17 and 18 may be utilized in order to minimize the possibility of tearing the filtering material or the stitches, as occasionally happens in instances where a plurality of rows of stitching are utilized and care is not taken to avoid overlapping of the first row of stitching. Where special types of sewing machines are available there may be multiple parallel rows of stitches to secure together the edges of the envelope. The stitching 18 does not extend entirely to the transversally folded end 13 but stops short of it to leave a portion which may be opened to form a loop 19, the purpose of which will be hereinafter described.

A filtering material which has been found to give excellent results is a filter paper comprised of approximately eighty percent cotton and twenty percent chemical wood pulp, the paper being treated for wet strength with a synthetic resin material such as melamine resin. This particular paper possesses excellent filtering properties, does not easily disintegrate and is amply tough to withstand considerable abuse.

After the end and side edges 14 and 16 of the strip have been stitched together, a strip of flexible material, preferably wire cloth or wire screen 20 which has been cut to suitable size is inserted between the opposite sides or leaves 8 and 10 of the filter envelope. The strip of screen material is preferably of less width than the filter paper so that it does not extend to the outer edges thereof and preferably terminates adjacent the transverse fold which forms the loop 19 at one end of the filter sleeve or envelope. The strip of screening material 20 may be inserted between the leaves 8 and 10 so that it does not lie between the unstitched longitudinal outer edges 22 of the filter material and thereafter an additional single row of stitches 23 may be sewed along this edge. If desired, the leaves may be sewn together first and then a woven wire cloth inserted between them, or the wire cloth or screen can be inserted between the leaves and then both edges sewn at the same time. It has been found that a screen material having approximately one-quarter inch openings, gives excellent results during the filtering operation to be hereinafter brought out. Also, this type of commercially available metal screen material is sufficiently pliable to be readily folded or rolled into the final shape of the filter strip. A fiber glass filter cloth may also be used. A wire cloth with much smaller openings also gives excellent results, hence the invention is not limited to a particular type of screen or cloth.

There has thus been constructed an envelope or flattened sleeve having opposite sides 8 and 10 of filter paper separated by an intermediate flexible screen cloth 20. One end 14 of the envelope and its two longitudinal outer edges 16 and 22 are closed by stitching except adjacent the transversally extending loop 19 which is adapted to receive a tube 25 having perforations 26 therein providing communication with the interior of the sleeve and with the discharge conduit 5 of the filter. While the sleeve has been described as manufactured from a flat strip of filter paper it will be clear that it could be made by inserting the screen strip endwise into the open end of a flattened tube of filter paper.

The sleeve or envelope may also be manufactured by forming a circular opening of suitable size at the center of a strip of filter paper, cutting semicircular recesses or holes at the outermost opposite side or marginal edges of the paper, in line with the center opening, folding together these latter side edges inwardly toward each other along a longitudinal axis of the filter paper strip so that the edges of the semicircular paper strip complement each other to form a single circular opening, inserting grommets into both the first circular openings and the single circular opening formed by the complementary semicircular openings, and thereafter securing together by any suitable means the free marginal edges of the envelope. A separating material of wire cloth or wire screen and a perforated tube may then be inserted lengthwise into the envelope and transversally into the resulting aligned circular openings, respectively.

The perforated tube 25 is inserted into the loop 19 formed by the unstitched portion of the envelope (Figs. 2 and 3). While the end 28 of the wire screen material is shown in Fig. 2 as extending only a short distance into the loop 19, it may be wound into cylindrical shape 29 (Fig. 3) prior to insertion between the opposite sides 8 and 10 of the filter envelope. In the latter event the perforated tube 25 is inserted into the interior of this wire cylinder; this construction may be considered desirable in some instances as providing a relatively large area or volume in communication with the conduit formed by the envelope and screen combination.

The perforated tube 25 should be securely retained within the loop 19 and this is preferably achieved by rolling the perforated tube and surrounding loop back upon the adjacent portion of the envelope for approximately one revolution (Fig. 2 and 4) and thereafter applying an annular washer sealing means 31 and an annular metal retaining cap 32 over each end of the perforated tube and coiled filter envelope. Each of the metal caps 32 is preferably provided with a slot 34 which fits around the adjacent edge of the envelope and each cap is preferably crimped or rolled inwardly to firmly clamp against the perforated tube 25, intermediate folds 8 and 10 of filter paper and wire screen 20. In order to minimize wear due to abrasion or cutting of the filter envelope at the point where it emerges from the slot 34 of an end cap 32, the edge of the envelope may be protected by covering it with a fold or layer of thin, strong, cloth material 35 similar to adhesive tape. This extra layer of cloth minimizes wear or cutting of the filter paper by any rough edges on the slot 34. It will be clear that such a reinforcing or protecting strip could be extended, if deemed advisable, to cover the entire lengths of the edges 14, 16 and 22.

While the caps 32 have been described as metal caps and have given excellent results, other materials may be utilized; for example, a cap made from synthetic material such as neoprene could be placed over the ends of the perforated tube 25 and coiled envelope and retained in position by a metal holding band.

The felt washer sealing means 31 which is placed over each end of the perforated tube 25 and coiled envelope prior to applying the end caps 32 is formed with a central opening having a smaller diameter than the outside diameter of the central tube or discharge pipe 5 located within the filter shell 1. The purpose of this feature is to provide a circumferential seal which bears firmly against the discharge pipe 5 and prevents passage of any liquid between the washer and the pipe 5 during operation of the filter. This feature will be further brought out in connection with the description of the operation of the filter. The washer 31 is not limited to the use of felt for its construction; materials such as neoprene, cork, or similar materials could be utilized in lieu of felt.

The actual filtering of the oil is performed by the above described elongated envelope or flattened tube, which is preferably utilized in connection with the "outside-in" principle of operation. That is, dirty or unclean oil comes in contact with the outside of the envelope and as oil passes through the filter material to the interior of the envelope any dirt, sludge, particles of metal and any other solid foreign matter are caught by the filter paper. Only clean filtered oil appears at the interior of the envelope. The wire screen 20 separates the sides 8 and 10 of the envelope and oil filters into the central space from both sides of the envelope. In addition, separating the sides of the filter by the screen provides a duct or passageway that extends lengthwise of the envelope and terminates at the perforated tube 25. Clean oil flows along the envelope duct and into the perforated tube, from which it is removed through the discharge pipe 5 without coming into contact with unfiltered oil.

Since the envelope shown in Fig. 2 is of great length it is impractical to utilize it without folding in some way. The criterion to be sought is a construction which contains all the desirable features of the tubular-like filter plus the compactness of arrangement necessary for use under the crowded hood of an automobile. In the present device both of these features are achieved by rolling or winding the elongated envelope into spiral form about the perforated tube 25 which thus serves as a core. The envelope should not be rolled so tightly as to form a solid mass but only sufficiently to provide a compact arrangement and yet allow free passage of oil between adjacent layers of the coiled envelope. The coiled envelope may be retained in spiraled form by means of an annular strip 37 of filtering material or by a rubber band or by a similar means which extends around the periphery of the envelope. The loop 37 is formed from filter paper of the same type as that comprising the opposite sides of the envelope so that it does not interfere with filtering of oil. In addition to serving as a retaining means for holding the spiraled filter unit in position, the band 37 may be provided with printed instructions on its exterior surface directing the correct installation of the filter unit into a filter case; the printed instructions are thus on the filter itself and where they will be read by a mechanic, rather than on a box which is generally discarded without even glancing at the instructions.

If desired, the filter unit may be enclosed within a perforated can or within a container or basket made from a material such as wire screening or wire cloth. Such a container does not interfere with the filtering operation and protects the filter unit in instances where it may be subjected to rough handling.

In operation contaminated oil enters through the inlet nipple 2 at the upper portion of the filter shell 1 and fills the shell. The filter cartridge or unit 4 is thus submerged in a bath of contaminated oil 6. The particles of solid matter in this oil must be removed prior to return thereof to the lubrication system of the engine and unit 4 accomplishes this. The oil which covers the filter unit 4 seeps or filters through the walls 8 and 10 of the spiraled envelope to the space at the interior thereof provided by the wire screen 20 and during the seepage or filtering process particles of solid material carried by the unclean oil are caught and strained out of it by the filter paper, thus oil which arrives at the interior of the envelope has had removed from it any particles of solid matter. The screen 20 holds the opposite sides of the envelope separated from each other so that filtering may take place simultaneously from opposite sides 8 and 10 of the envelope. Clean oil which arrives at the interior of the envelope or sleeve flows around the interior thereof to the perforated tube 25, passes through the openings 26 to the interior of this tube and through additional openings 9 in the hollow discharge line or center post 5.

The felt washers 31 normally have openings of smaller diameter than the outside diameter of the exit line 5 and hence grip it firmly to form tight circumferential seals at each end of the filter unit 4. This construction facilitates removal of a clogged filter unit and its replacement by a new unit or cartridge as it is merely necessary to remove the securing bolt 12 and cover 15 from the filter shell 1, slide the old unit off the center tube 5 and slide a new unit into position. From the discharge line 5 oil is conducted to a suitable oil reservoir.

The operation is continuous; oil continues to enter at the inlet 2, passes into the filter unit 4, and clean oil is conducted to the discharge conduit 5. It has been found that the flow of oil into the shell 1 combined with the smooth walls afforded by the filter paper of the envelope provide a washing effect which tends to remove or wash particles of dirt from the exterior of the envelope and causes them to drop to the bottom of the shell 1. This is an advantageous feature for the accumulation of considerable amounts of solid matter on the surfaces of a filter decrease the volume of flow through the filter, hence anything which can be done to remove particles of solid matter from the surface of a filter without interfering with the filtering action is most desirable.

While it is possible to connect the filter cartridge 4 into a filter case so that it operates on an "inside-out" principle, the unclean oil entering the inside of the envelope and clean oil coming out of the exterior surfaces, it is believed that the "outside-in" principle of operation gives better operating results over a period of time.

In Fig. 6 there is illustrated a modified form of the invention wherein the oil discharge pipe 5a of comparatively short length is utilized. In this instance the apertured end cap 32 is replaced by a cap 32a which does not have an aperture therein. The lower end of this modified form of filter unit 4a is similar to that of the preferred embodiment. The operation of this modified filter is also like that described above in connection with the preferred embodiment.

It will be seen that the present invention provides a new and improved filter for cleaning lubricating oils or the like. The filter is relatively light in weight simple in construction and operation and the expendable filter cartridges may be readily removed and replaced by a new cartridge. The sealing means separating the contaminated oil from clean, filtered oil forms a tight circumferential barrier that automatically comes into being when the filter unit is pushed onto an outlet conduit; no subsequent adjustment of nuts, bolts, and gaskets is necessary. The wire screen separator holds the filter walls apart at all times and facilitates rolling or forming of the filter envelope into a compact spiral shape. The walls of comparatively smooth filter paper perform excellently as filters and facilitate a cleaning or washing effect that tends to remove impurities from the walls during operating conditions.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described one embodiment of the invention in some detail, what is claimed is:

1. An oil filter comprising, in combination, a shell having an oil inlet, a discharge conduit extending into said shell, a filtering means extending generally spirally about said discharge conduit, a perforated tubular member connected with said filtering means extending about said discharge conduit and positioned to receive oil from the filtering means, a holding member carried by the filtering means, a seal held by the holding member against the discharge conduit and the tubular member in position to seal off the discharge conduit from the oil external to the filtering means.

2. An oil filter comprising, in combination, a shell having an oil inlet, a discharge conduit extending into said shell, a filtering means comprising two walls of filtering material extending generally spirally about said discharge conduit, a separator within said filtering means maintaining the opposite walls thereof spaced from each other, a perforated tubular member connected with said filtering means extending about said discharge conduit and positioned to receive oil from the filtering means, and sealing means carried by said tubular member and filtering means adjacent each end of the tubular member forming circumferential seals against the exterior surface of said discharge conduit to seal off the conduit from the oil external to the filtering means whereby leakage of contaminated oil into the discharge conduit is minimized.

3. An oil filter device adapted to be positioned within a shell having an oil inlet and around a discharge conduit which extends into said shell, comprising filtering means of continuous length including adjacent walls of filtering material for extending generally annularly about said discharge conduit, a perforated tubular member connected with said filtering means for extending about said discharge conduit and positioned to receive oil filtered through the filtering means, and sealing means carried by said tubular member and filtering means resting against at least one end of the tubular member for forming a circumferential seal against the exterior surface of said discharge conduit to seal off the conduit from the oil external to the filtering means whereby leakage of contaminated oil into the discharge conduit is minimized.

4. A device of the class described comprising the combination of filtering means including an annularly arranged length of filter paper having opposite ends thereof joined together and opposite side edges sealed against leakage, an open ended perforated tubular member encircled by and in fluid communication with said filtering means at all times adapted to receive filtered liquid through said perforations thereof, and apertured means overlying and in contact with top and bottom ends of said perforated tubular member and overlying and in contact with adjacent edges of said filtering means sealing them against passage of liquid, the aperture of said apertured means being in registry with the interior of said tubular member and of smaller diameter than the interior of said tubular member.

HENRY C. ZAUN.

REFERENCES CITED

The following references are of record in the file of this patent:

UNITED STATES PATENTS

| Number | Name | Date |
|---|---|---|
| 870,631 | Kneuper | Nov. 12, 1907 |
| 945,632 | Strahl | Jan. 4, 1910 |
| 1,693,717 | Lienesch | Dec. 4, 1928 |
| 1,742,768 | Kamrath | Jan. 7, 1930 |
| 1,791,046 | Sweetland | Feb. 3, 1931 |

FOREIGN PATENTS

| Number | Country | Date |
|---|---|---|
| 811,708 | France | of 1937 |